(12) United States Patent
Norouzi et al.

(10) Patent No.: US 11,043,213 B2
(45) Date of Patent: Jun. 22, 2021

(54) SYSTEM AND METHOD FOR DETECTION AND CORRECTION OF INCORRECTLY PRONOUNCED WORDS

(71) Applicant: SoundHound, Inc., Santa Clara, CA (US)

(72) Inventors: Katayoun Norouzi, San Jose, CA (US); Karl Stahl, Menlo Park, CA (US)

(73) Assignee: SoundHound, Inc., Santa Clara, CA (US)

( * ) Notice: Subject to any disclaimer, the term of this patent is extended or adjusted under 35 U.S.C. 154(b) by 39 days.

(21) Appl. No.: 16/212,695

(22) Filed: Dec. 7, 2018

(65) Prior Publication Data

US 2020/0184958 A1 Jun. 11, 2020

(51) Int. Cl.
| | |
|---|---|
| *G10L 15/22* | (2006.01) |
| *G10L 15/187* | (2013.01) |
| *G10L 15/04* | (2013.01) |
| *G09B 19/04* | (2006.01) |
| *G10L 13/00* | (2006.01) |
| *G06F 3/16* | (2006.01) |
| *G10L 15/08* | (2006.01) |

(52) U.S. Cl.
CPC ............ *G10L 15/187* (2013.01); *G06F 3/167* (2013.01); *G09B 19/04* (2013.01); *G10L 13/00* (2013.01); *G10L 15/04* (2013.01); *G10L 15/22* (2013.01); *G10L 2015/088* (2013.01); *G10L 2015/225* (2013.01)

(58) Field of Classification Search
CPC .............................. G10L 15/265; G09B 19/06
See application file for complete search history.

(56) References Cited

U.S. PATENT DOCUMENTS

| | | | |
|---|---|---|---|
| 6,397,185 B1 | 5/2002 | Komissarchik et al. | |
| 6,801,893 B1 | 10/2004 | Backfried et al. | |
| 9,711,141 B2 * | 7/2017 | Henton | G10L 13/08 |
| 9,966,060 B2 * | 5/2018 | Naik | G10L 13/027 |
| 10,073,832 B2 * | 9/2018 | Zelenkov | G06F 40/232 |
| 2003/0182111 A1 * | 9/2003 | Handal | G09B 5/04 704/231 |
| 2004/0193408 A1 * | 9/2004 | Hunt | G10L 15/08 704/209 |
| 2006/0057545 A1 * | 3/2006 | Mozer | G09B 19/04 434/156 |
| 2006/0058996 A1 * | 3/2006 | Barker | G09B 5/04 704/231 |

(Continued)

OTHER PUBLICATIONS

Kanishka Rao, et al., Automatic Pronunciation Verification for Speech Recognition, Acoustics, Speech and Signal Processing (ICASSP), 2015 IEEE International Conference on. IEEE, 2015.

(Continued)

*Primary Examiner* — Daniel Abebe

(57) ABSTRACT

A system and method are disclosed for capturing a segment of speech audio, performing phoneme recognition on the segment of speech audio to produce a segmented phoneme sequence, comparing the segmented phoneme sequence to stored phoneme sequences that represent incorrect pronunciations of words to determine if there is a match, and identifying an incorrect pronunciation for a word in the segment of speech audio. The system builds a library based on the data collected for the incorrect pronunciations.

15 Claims, 14 Drawing Sheets

(56) References Cited

U.S. PATENT DOCUMENTS

| | | | |
|---|---|---|---|
| 2006/0064037 A1 | 3/2006 | Shalon et al. | |
| 2006/0143008 A1* | 6/2006 | Schneider | G10L 15/063 704/251 |
| 2009/0150154 A1* | 6/2009 | Jang | G10L 15/22 704/254 |
| 2009/0220926 A1* | 9/2009 | Rechlis | G09B 19/04 434/185 |
| 2014/0278421 A1* | 9/2014 | Komissarchik | G10L 15/26 704/251 |
| 2016/0163312 A1 | 6/2016 | Henton et al. | |
| 2017/0206805 A1* | 7/2017 | Salamini | A61B 5/7455 |
| 2018/0211650 A1* | 7/2018 | Knudson | G10L 15/183 |

OTHER PUBLICATIONS

Speechace LLC, Pronunciation & Fluency Assessment via Speech Recognition, https://www.speechace.com/, Apr. 18, 2018.

B. Byrne, at al., Pronunciation Modelling for Conversational Speech Recognition: A Status Report from WS97, Automatic Speech Recognition and Understanding, 1997. Proceedings., 1997 IEEE Workshop on. IEEE, 1997.

Paolo Baggia, Pronunciation Lexicon Specification (PLS) Version 1.0, W3C, https://www.w3.org/TR/pronunciation-lexicon/. Apr. 19, 2018.

Jack C. Richards, A Non-Contrastive Approach to Error Analysis, Error analysis: Perspectives on second language acquisition (1989): 172-188.

Pooneh Heydari, Error Analysis: Sources of L2 Learners' Errors, Theory & Practice in Language Studies 2.8 (2012).

Ekaterina Kochmar, Identification of a Writer's Native Language by Error Analysis, Diss. Master's thesis, University of Cambridge, 2011.

Patrizia Bonaventura, Phonetic rules for diagnosis of pronunciation errors, 2002.

Stephen Wan, et al., Automatic English-Chinese name transliteration for development of multilingual resources, Proceedings of the 17th international conference on Computational linguistics—vol. 2. Association for Computational Linguistics, 1998.

* cited by examiner

1

SYSTEM AND METHOD FOR DETECTION AND CORRECTION OF INCORRECTLY PRONOUNCED WORDS

FIELD OF THE INVENTION

The present invention is in the field of systems with real-time speech recognition, and more specifically, to ones with an integrated virtual assistant for user interfaces.

BACKGROUND

Automatic speech recognition (ASR) systems convert speech-to-text. ASR systems do not recognize incorrect pronunciations, stress, or tones in speech utterances, especially by non-native speakers. Furthermore, ASR systems that include virtual assistants do not offer a way, especially to non-native users, to check the accuracy or correctness of the pronunciations.

Most language learning apps teach words, phrases, grammar, etc. level by level, and at the end of each level, using what has been covered so far, the learning application will quiz the user's knowledge on listening. For example, audio plays, and the user writes down what is heard, meanings of words/phrases seen on the screen page, or translation of a phrase/sentence from one language to another.

When a word with a segment of speech is mispronounced, ASR systems may not recognize that segment of speech due to the mispronounced word. The problems especially occur due to the user's accent, incorrect stress of certain syllables, pronunciation inaccuracy, identical pronunciation with context variations, and homophone ambiguity.

Additionally, most pronunciation or phonetic dictionaries have multiple correct pronunciations for some words. However, these dictionaries do not provide or store recognizable, though incorrect, pronunciations of words. Conventional pronunciation dictionaries store multiple pronunciations but fail to provide to track common incorrect pronunciations.

Therefore, what is needed is a system and method for determining when words are incorrectly pronounced or when the pronunciation provides an inaccurate context within the speech through a stored library of incorrect or inaccurate pronunciations.

SUMMARY OF THE INVENTION

Systems and methods are provided for determining when words are incorrectly pronounced or when the pronunciation indicates a meaning that is inaccurate within the context of the speech. According to an embodiment of the invention, the system and method disclosed also help with correction of pronunciations.

An embodiment of the system includes a Virtual Assistant (VA) and an Automatic Speech Recognition (ASR) system that captures a segment of speech audio, perform phoneme recognition on the segment of speech audio to produce a segmented phoneme sequence, compares the segmented phoneme sequence to stored phoneme sequences that represent incorrect pronunciations of words to determine that there is a match, thereby identifying an incorrect pronunciation for a word in the segment of speech audio. The system builds a library based on the data collected for the incorrect pronunciations.

DETAILED DESCRIPTION

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" have an effectual relationship realizable by a direct connection or indirectly with one or more other intervening elements.

Figure 1A:
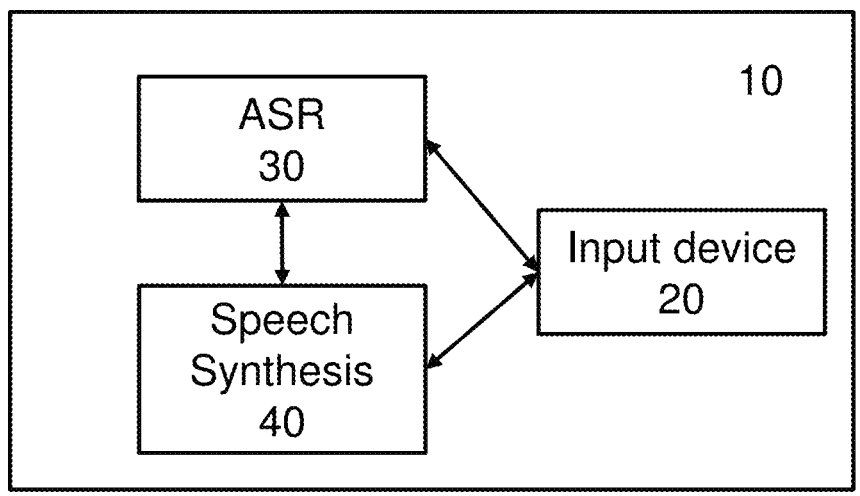
FIG. 1A shows a system that includes an Automatic Speech Recognition (ASR), a speech synthesis, and an input device according to an embodiment of the invention.
Figure 1B:
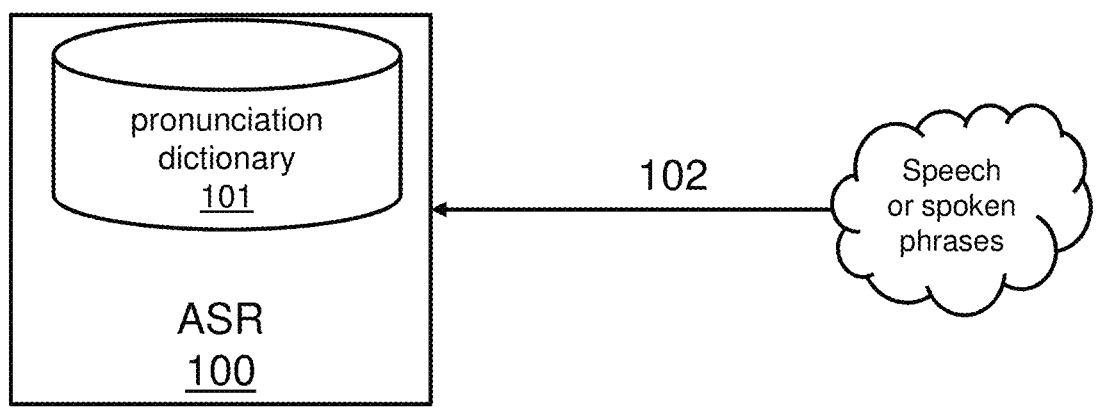
FIG. 1B shows an Automatic Speech Recognition (ASR) system that receives a user's spoken words according to an embodiment of the invention.

In accordance with an embodiment of the invention, FIG. 1A shows a system 10 that includes an input device 20 in communication with an Automatic Speech Recognition (ASR) unit 30 and a speech synthesis unit 40. In accordance with an embodiment of the invention, FIG. 1B shows an Automatic Speech Recognition (ASR) system 100 that receives incoming speech 102, which is made up of words.

The ASR system 100 uses a specific language as the speech is detected. In some embodiments, the user selects the specific language. For example, if the user has set the ASR system 100 to receive and synthesize the received speech in English, then it assumes that the incoming speech is in English.

In accordance with an embodiment of the invention, a word is defined relative to any spoken language and can be represented in written form using characters or letter based on any writing system, including an alphabetical writing system, an abjad writing system, an abugida writing system, and a logographic writing system. For example, an English spoken word may be represented using an alphabetical writing system. In accordance with another embodiment of the invention, an English spoken word may be represented by Chinese characters, such that when a person that reads Chinese pronounced the characters aloud, the sound made is the equivalent to the English spoken word so that word is pronounced in English. In accordance with another embodiment of the invention, the word may be spoken in Arabic and the Arabic sounds are represented by Roman alphabetical letters.

When the user speaks the words, then the ASR system 100 receives and synthesizes the words in the speech. The ASR system 100 can detect and recognize words that have incorrect pronunciations. In accordance with some embodiments, the ASR system synthesizes the words with emphasis on an incorrectly pronounced word or stress on a mispronounced syllable. In accordance with some embodiments of the invention, the ASR system 100 receives a wake-up phrase. The wake-up phrase can be in any language. In accordance with one embodiment of the invention, the ASR system 100 uses the detected language of the wake-up phrase to set or define the language for detection of the rest of the speech. In this way, the ASR system 100 can be activated in any language using the spoken and detected language of the wake-up phrase.

Once the ASR system 100 is activated, the ASR system 100 analyzes part of the speech using Statistical Language Model (SLM), grammar, and contextual semantic analysis. In accordance with an embodiment of the invention, the ASR system 100 also uses the user's profile to provide further context to the speech.

Figure 2:
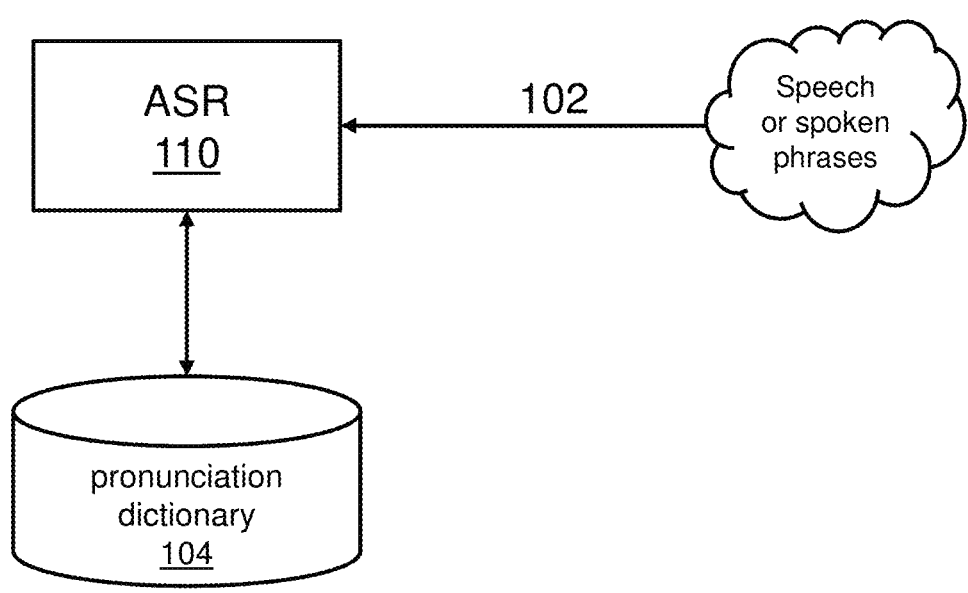
FIG. 2 shows an ASR system, which is in communication with a remotely located pronunciation dictionary, that receives a user's spoken words according to an embodiment of the invention.

Referring to FIG. 1B and FIG. 2, in accordance with an embodiment of the invention, the ASR system 100 includes a pronunciation dictionary 101. In accordance with other embodiments of the invention, the ASR system 110 can access a pronunciation dictionary 104 located remotely. In accordance with various embodiments of the invention, a pronunciation dictionary comprises recognizable pronunciations. The recognized pronunciations in the pronunciation dictionary are created using curation, automatic detection algorithms, and training models.

Creating a pronunciation dictionary with curated incorrect pronunciations involves humans, such as second language teachers, linguists, lexicographers, or professional editors identifying common mispronunciations of words; adding the incorrect pronunciations to a pronunciation dictionary; and indicating in or with the dictionary that the added pronunciations are incorrect.

Creating a pronunciation dictionary by automatic detection involves performing automatic speech recognition on speech audio. One such way is by performing ASR in a way that produces an acoustic model score and a language model score for each transcription; and identifying transcriptions with low acoustic model scores but high language model scores. Mispronunciations are often close enough to correct pronunciations as to be recognized phonetically, though with low confidence. If the transcription has a high language model probability, the transcription is probably correct, just with an incorrect pronunciation. This can be used to automatically update a pronunciation dictionary, or to provide humans with suggestions of common mispronunciations to consider for inclusion in a pronunciation dictionary.

Creating a pronunciation dictionary by training models, especially when done in an unsupervised way, involves generating new pronunciations for words, particularly using known common phoneme replacements in incorrect pronunciations, such as similar vowel or similar consonant sounds like θ and T. In accordance with the present invention, a pronunciation dictionary can be created to include correct and incorrect pronunciations for any language. For generated incorrect pronunciations that are commonly used, applying speech recognition to a corpus of speech audio using a pronunciation dictionary with the generated new pronunciations will produce higher recognition scores. Accordingly, a system can automatically learn common incorrect pronunciations and either add them to a master pronunciation dictionary or provide them to a human as suggestions for inclusion.

The pronunciation dictionary 101 and 104 include multiple pronunciations, including "incorrect" ones. Incorrect pronunciations are tagged as such in the pronunciation dictionary. Some embodiments store different weights associated with various pronunciations for words, in which case weights below a threshold are considered incorrect. In accordance with an embodiment of the invention, the pronunciations in the pronunciation dictionary 101 and 104 are user-profile-specific. In accordance with an embodiment of the invention, the pronunciations in the pronunciation dictionary are general. In accordance with an embodiment of the invention, the ASR system 100 uses a user-profile-specific SLM when analyzing or synthesizing the speech.

In accordance with an embodiment of the invention, the ASR system 100 accesses a profile for the user. The profile for the user includes information about the typical errors that the user makes when communicating. Accordingly, the profile information allows the ASR system 100 to predict the user's typical errors. One way that the user account profile information can be used is acoustic or phonetic classification. One way that the user account profile information can be used is classifying by identifying types of grammatical mistakes. For example, a classification can predict problems (rescore problem hypotheses) such as missing articles and incorrect pronoun gender.

Figure 3A:
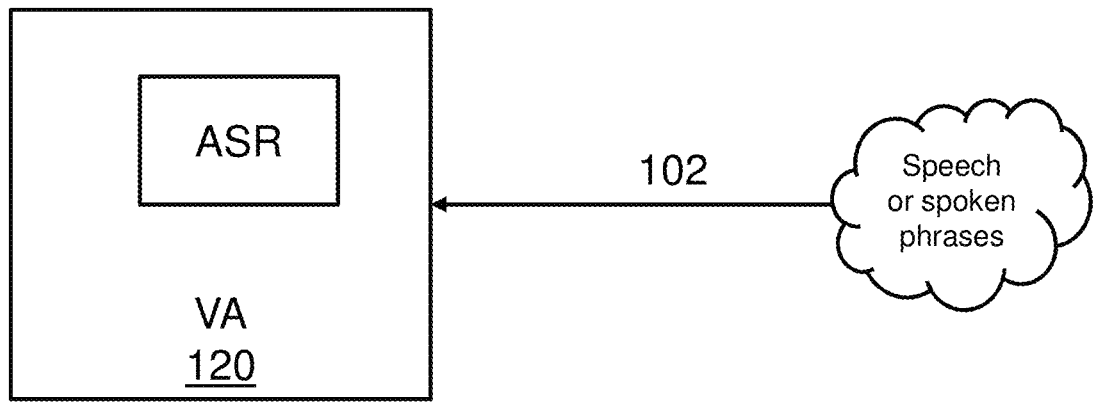
FIG. 3A shows a Virtual Assistant (VA) that includes an ASR in according to an embodiment of the invention.
Figure 3B:
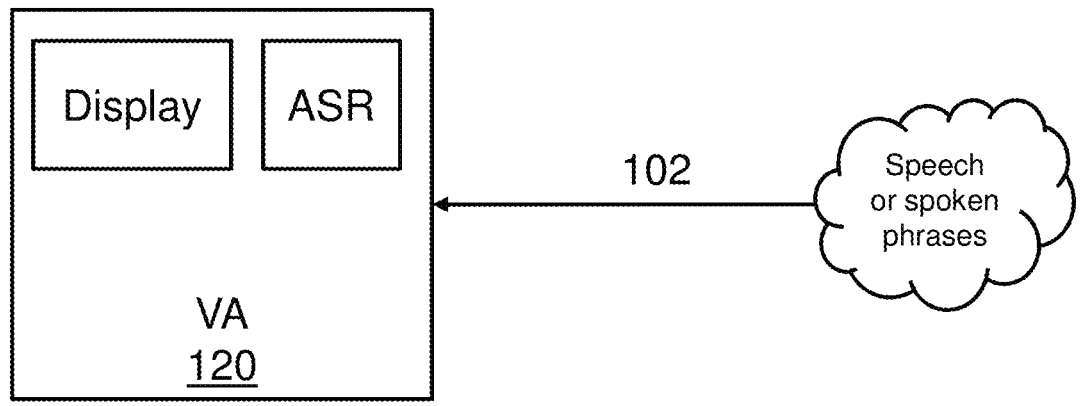
FIG. 3B shows a Virtual Assistant (VA) that includes an ASR and a display in according to an embodiment of the invention.

Referring now to FIG. 3A, a Virtual Assistant (VA) 120 is shown that includes an ASR, such as the ASR 100 of FIG. 1B or ASR 110 of FIG. 2. Referring now to FIG. 3B, a Virtual Assistant (VA) 120 is shown that includes an ASR, such as the ASR 100 of FIG. 1B or ASR 110 of FIG. 2, and a display. Virtual assistants provide user interfaces, such as voice interfaces or visual display interfaces, that allow a user to make requests and receive machine-generated responses.

Figure 4A:
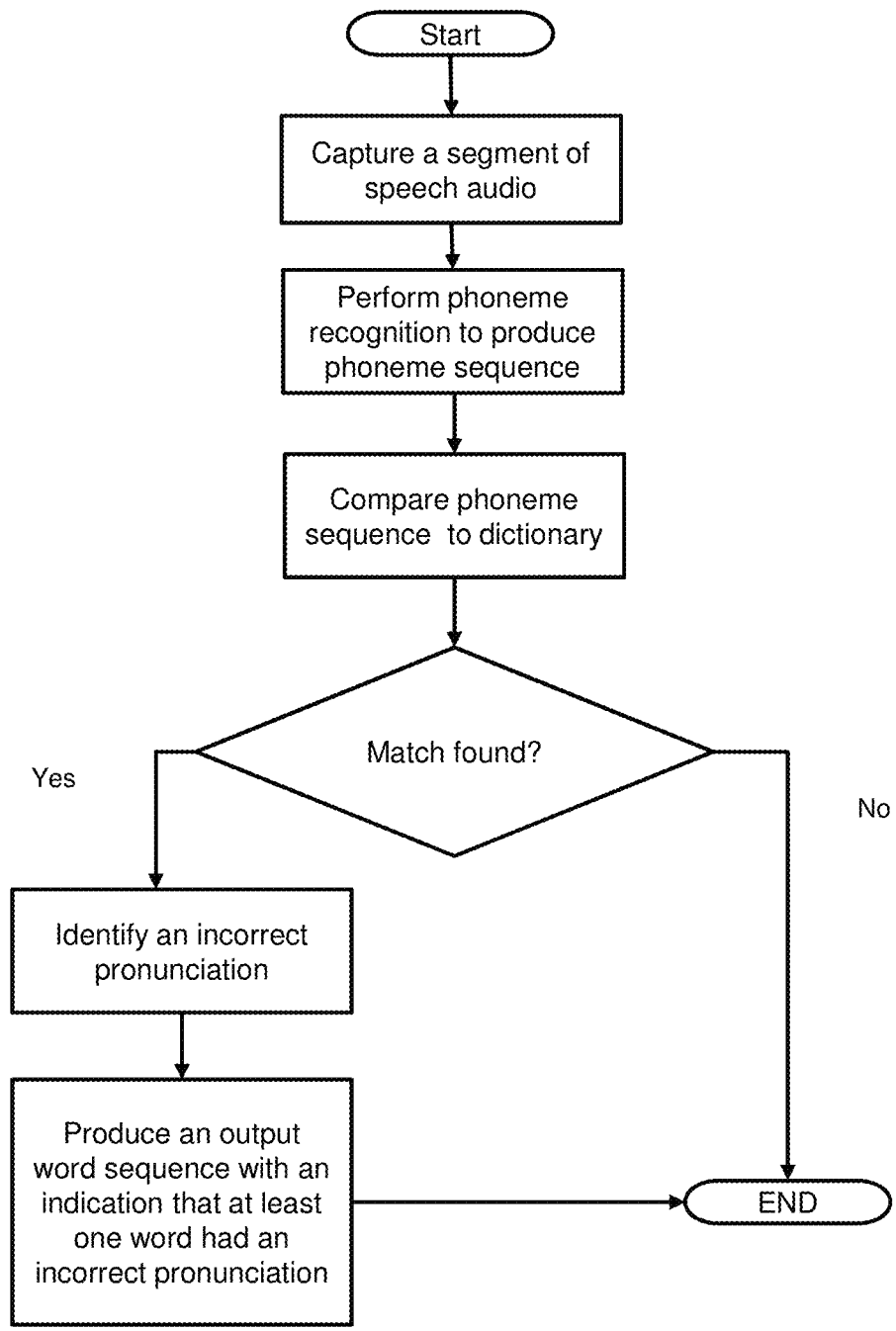
FIG. 4A is a flowchart for detection of incorrect pronunciations in accordance with an embodiment of the invention.
Figure 4B:
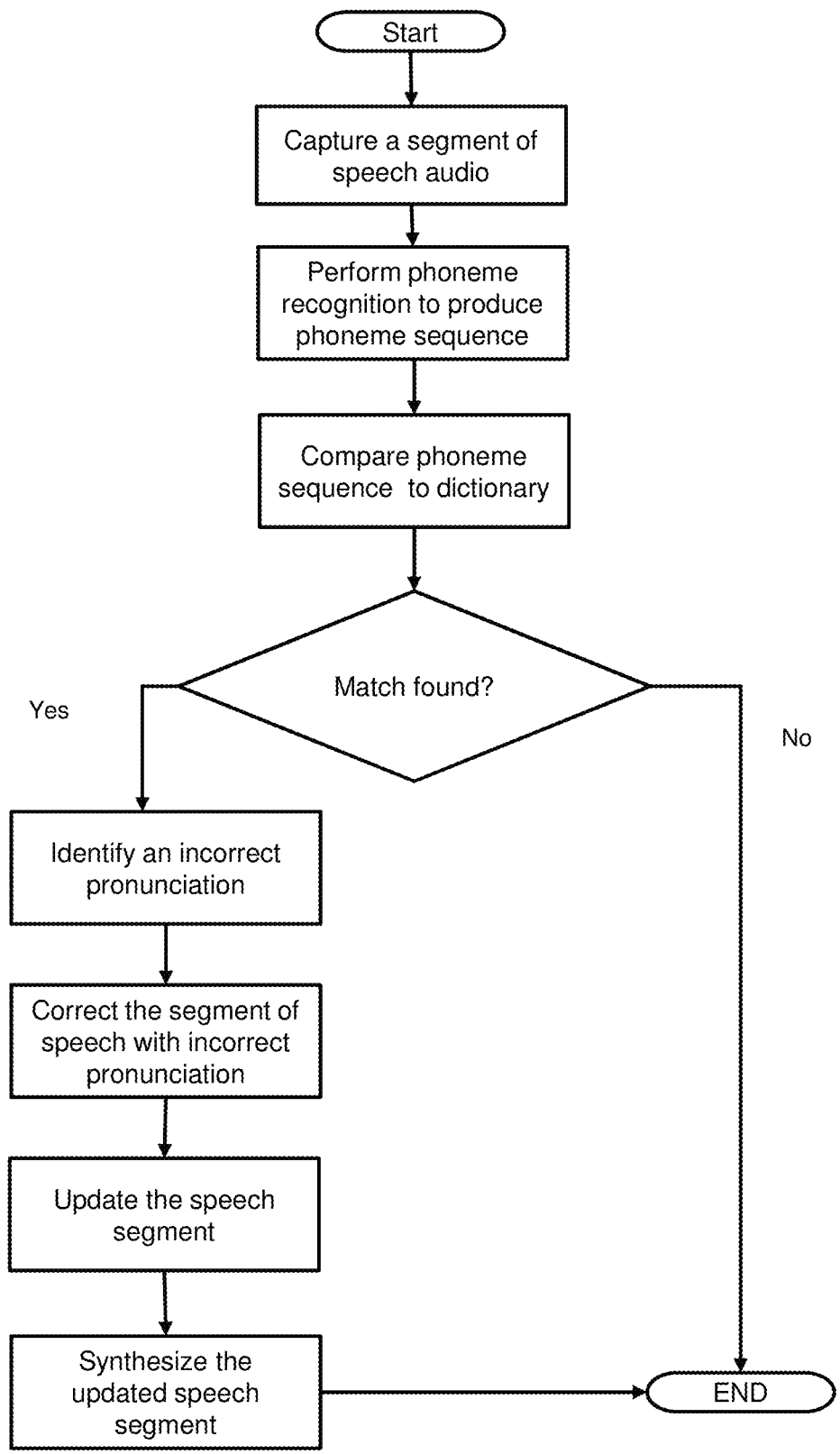
FIG. 4B is a flowchart for detection and correction of incorrect pronunciations in accordance with an embodiment of the invention.

Referring to FIG. 4A and FIG. 4B, the user's spoken utterance is captured as speech by the ASR. The speech is digitally represented as a phoneme sequence. The phoneme sequence is segmented into words to produce a word sequence. The segmentation process uses a pronunciation dictionary and, in some embodiments, a statistical language model. The segmented phoneme sequence is compared to a pronunciation dictionary having incorrect word pronunciations to determine if a word in the speech audio is incorrectly pronounced. The method of recognizing incorrect pronunciations of words produces an output word sequence with a corresponding indication that at least one word in the output word sequence had an incorrect pronunciation in the captured segment of speech audio. Some embodiments merely indicate that the whole sequence of speech audio had an incorrect pronunciation. Some embodiments indicate, for each word in the output word sequence, whether it had an incorrect pronunciation.

For example, consider speech audio that includes a pronunciation that can be either one of "Thyme" or "Time." The pronunciation may be incorrect depending on the context. If the speech audio includes any words related to food, and the user is pronouncing thyme /θaɪme/ rather than /Taɪme/, then the pronunciation is incorrect. Detecting incorrect pronunciations by topic will generally be apparent from low SLM scores. It is also possible to detect by whether speech transcriptions can be parsed by topic-specific natural language grammars. Thus, if there is incorrect pronunciation, then the VA can recognize the incorrect pronunciation. The ASR detects the incorrect pronunciation. The ASR corrects the segment of speech with the incorrect pronunciation and synthesizes speech with the correct pronunciation by converting the speech audio into sequences of instances of recognizable phonemes and matches the phoneme sequences to known correct and incorrect pronunciations of words. The speech is then synthesized with the correct pronunciation.

In accordance with an embodiment of the invention, VA includes the ability to help users practice speaking and real conversation skills and determine if they say words with correct pronunciation. Furthermore, the VA includes a conversational learning system where the user talks back and forth with the VA using information that has been provided and learned from the Virtual Assistant (VA). At the very least, the VA can write a transcript and ask the user to pronounce the word/phrase in the language being taught and then VA can respond by either "Correct" or "The correct pronunciation is" and pronounce the word. The VA can also return written response of the phonetic transcript on the screen to better assist the user and ask the user to try to pronounce the word whenever the user is ready. For example, the user can say "Ok . . . I'm ready" as a wake-up phrase that can be set as a follow up wake-up phrase. In accordance with an embodiment of the invention, a user can have a brief continuous conversation with a VA based on the current skill level he/she has learned at the end of each level. This will help users develop language and pronunciation faster and better since the users are using words in a real conversation with the VA. The system can learn the user's errors in pronunciation and build a profile for the user with the user's poorly pronounced or weak words. The VA can build a library of weak words and focus on this library of weak words, which is tied to or based on the user's accent and native language/tongue.

Figure 5:
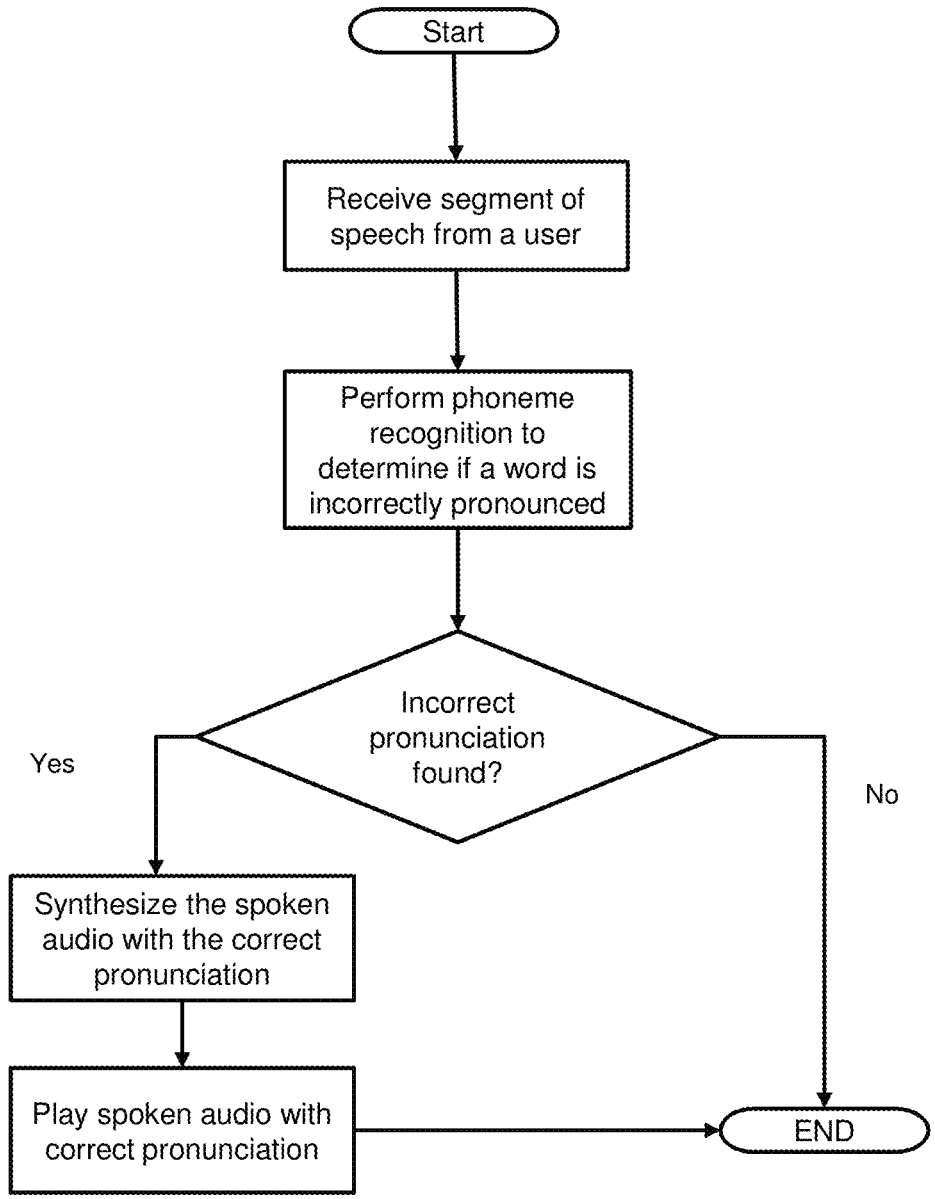
FIG. 5 is a flowchart for detection and correction of incorrect pronunciations that is played back to a user in accordance with an embodiment of the invention.

In accordance with an embodiment, after detecting the incorrect pronunciation, FIG. 5 shows a process wherein the VA 120 speaks back to the user a message with a correction of the error in the pronunciation. The VA 120 gives feedback to the user in order to help the user correct pronunciation.

Figure 6:
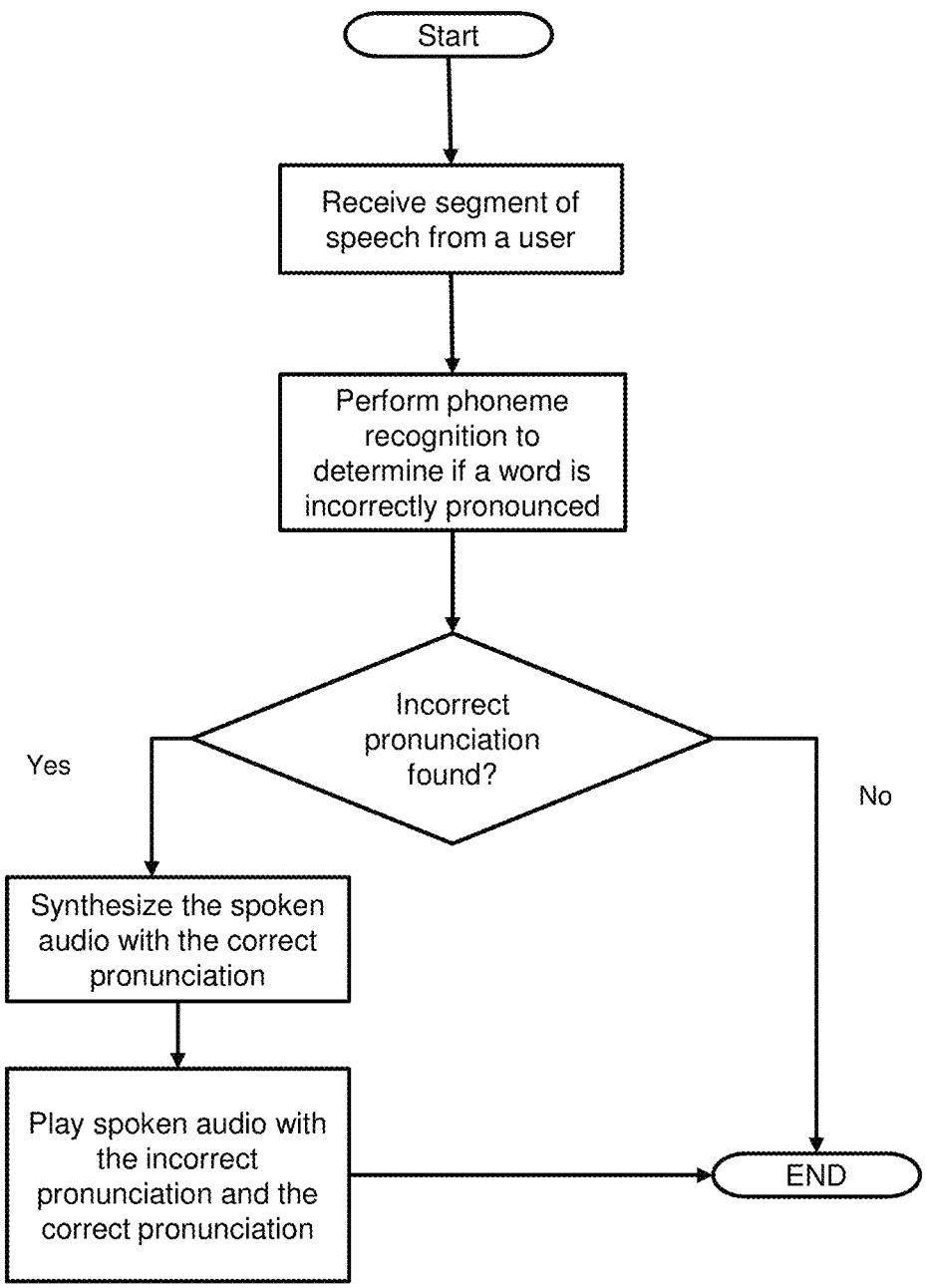
FIG. 6 is a flowchart for detection and correction of incorrect pronunciations and playback of the incorrect pronunciation with the correct pronunciation in accordance with an embodiment of the invention.

Referring to FIG. 6, in accordance with an embodiment, the VA 120 formulates a spoken response to include the incorrectly pronounced word with the correct pronunciation. The VA 120 gives both pronunciations as feedback to the user in order to help the user correct pronunciation. In this way, the VA 120 emphasizes the correct pronunciation in the response to highlight the error in conjunction with the incorrect pronunciation.

Figure 7:
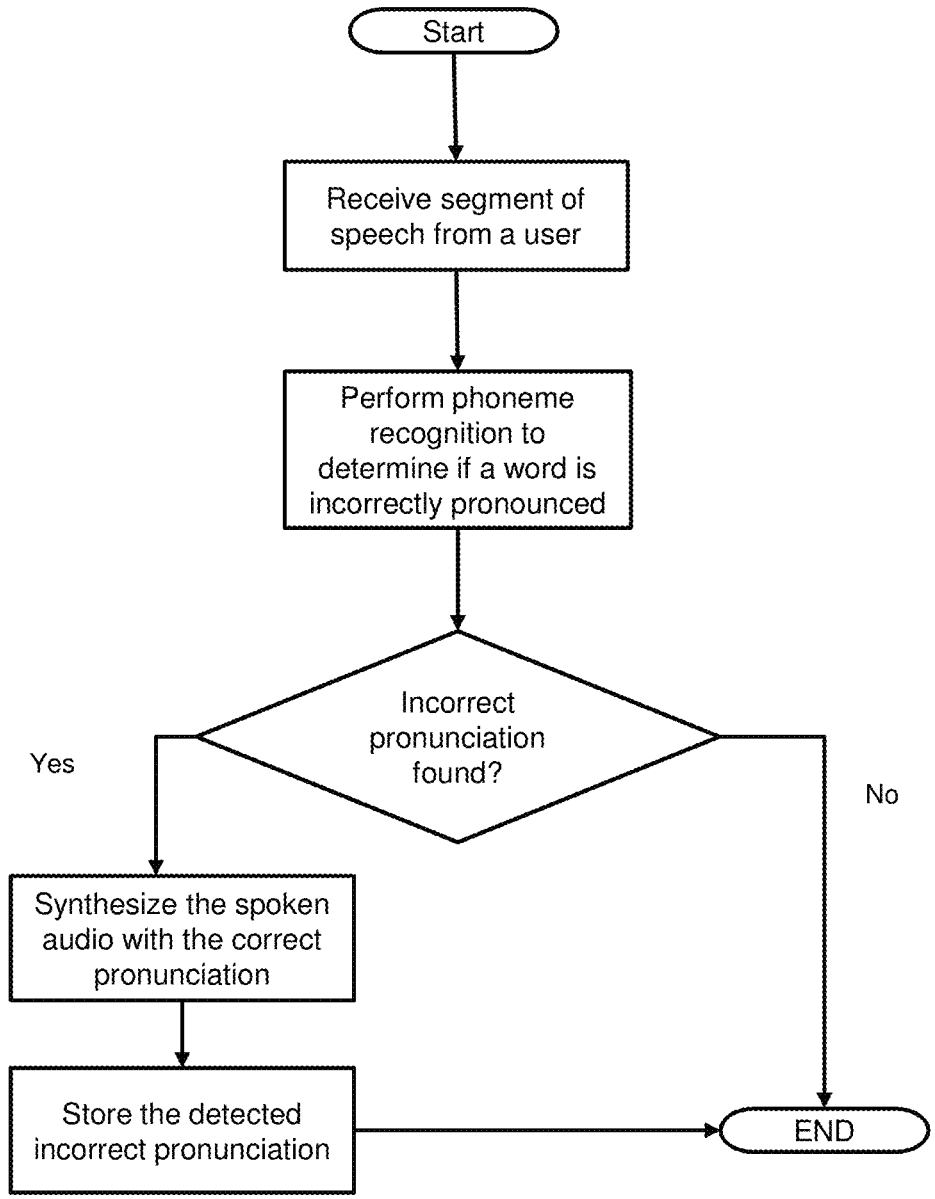
FIG. 7 is a flow chart for detection and correction of incorrect pronunciation and the incorrect pronunciation is stored in accordance with an embodiment of the invention.

Referring now to FIG. 7, In accordance with an embodiment of the invention and various embodiments, the VA 120 stores a list of detected mispronunciations for later review. A user may give and a VA may receive a command to disable recognition of incorrect pronunciations; and perform phoneme recognition on further speech audio to produce a second word sequence, wherein the second segment of speech audio includes an incorrect pronunciation of a word, and provide no response. This prevents the VA from being annoying.

Figure 8:
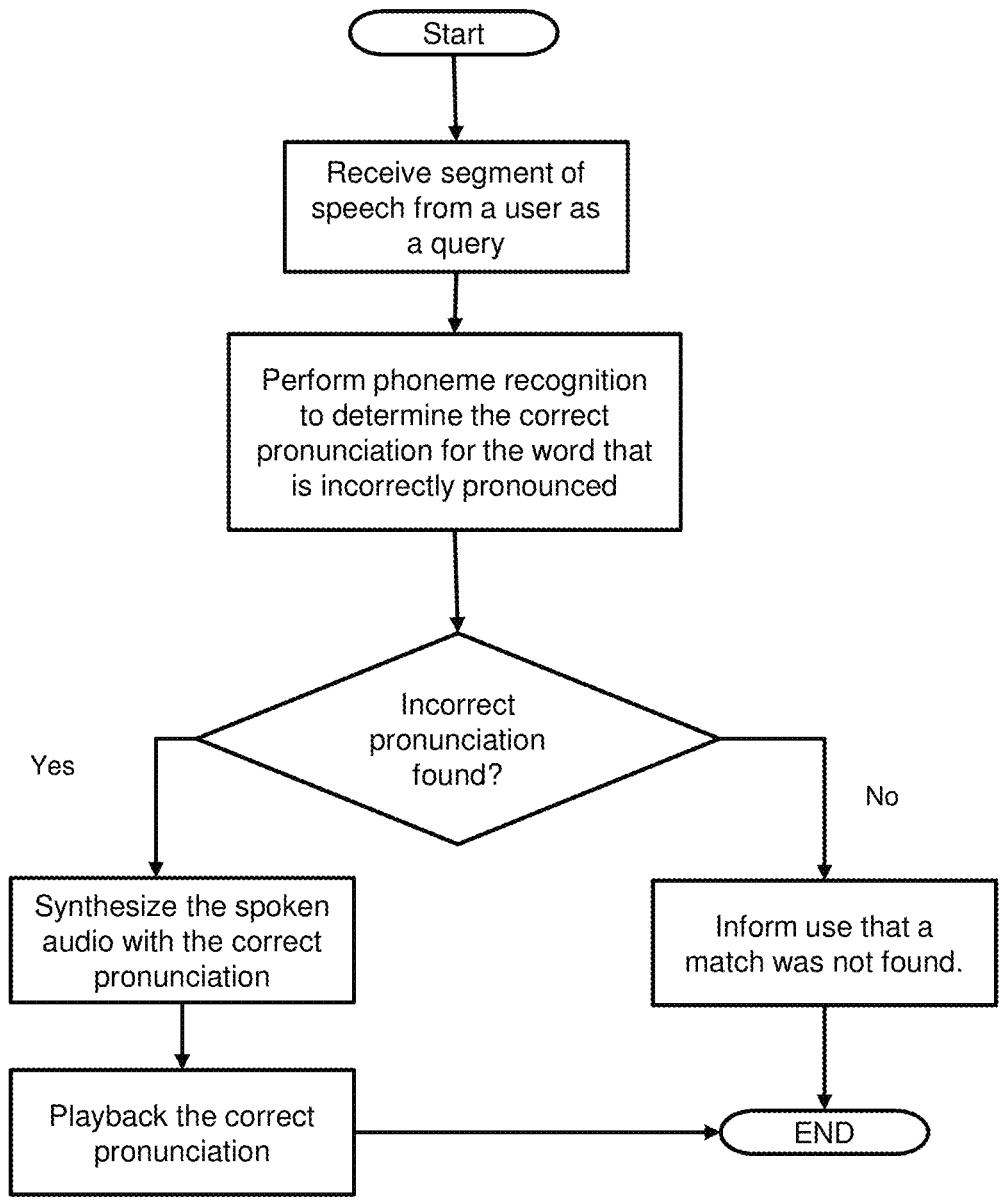
FIG. 8 is a flow chart for responding to a query for a correct pronunciation when the incorrect pronunciation is provided by the user to the system in accordance with an embodiment of the invention.

Referring now to FIG. 8, in accordance with an embodiment of the invention, the VA 120 receives a request from a user about pronunciation of a word. The VA 120 responds to questions from a user about pronunciation using the user's spoken, unambiguous; incorrectly pronounced word. Users can ask how to pronounce an unambiguous incorrectly pronounced word (e.g. "en-sic-lopedic"). The VA 120 does a minimum edit distance search of known pronunciations.

Users can ask how to pronounce incorrectly pronounced words when given with semantically related other words to disambiguate. Semantic relationships can be learned, like SLMs, from corpora of language usage. Some embodiments can improve accuracy for a given corpus or reduce the necessary size of a corpus to meet an accuracy requirement by training models of semantic relationships without considering ordering.

Figure 9:
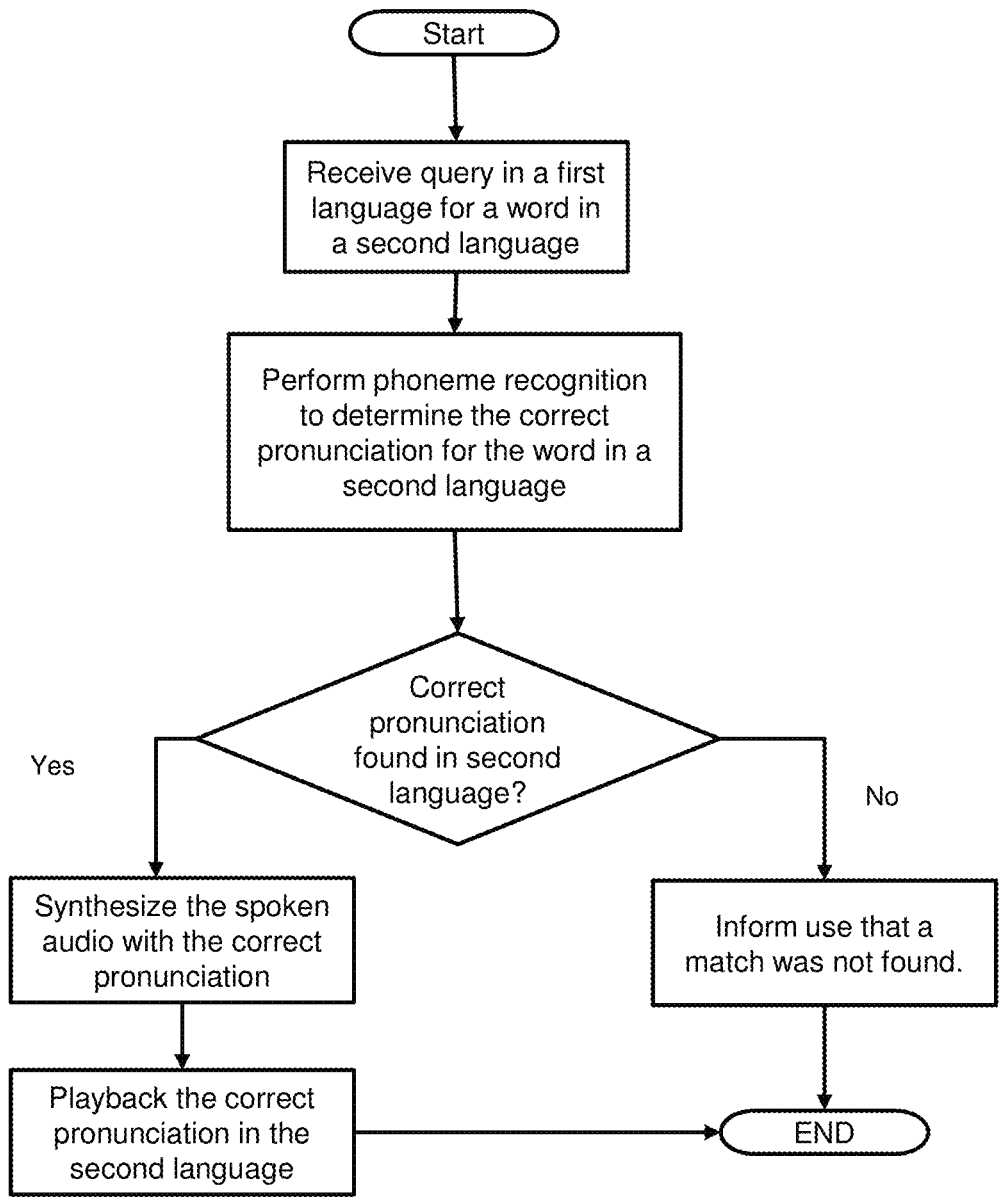
FIG. 9 is a flow chart for responding to a query for a pronunciation in a second language in accordance with an embodiment of the invention.

Referring now to FIG. 9, a process is shown wherein, in accordance with an embodiment of the invention, a user can ask how to say and/or pronounce a word, which is a word in a first language, which may be the user's native spoken or written language, that the user speaks, in a second language that is not the user's first spoken language. In this way, the VA 120 can act as a second language training system that understands and corrects pronunciation. For example, the user may say: "give me an example of <a word> in a sentence" and the VA 120 can provide the pronunciation and translation of <the word> in the second language. In accordance with the embodiments of the invention, "<the word>" or "<a word>" can be in the user's first langue while the response from the VA 120 can be in a second language. In accordance with an embodiment of the invention, the system selects the second language based on known parameters, such as location or user profile. The VA 120 responds in a conversational dialogue. The VA 120 may also include a visual display that shows the transcript with mispronounced words. In accordance with an embodiment of the invention, the VA 120 can also provide sounds, display phonetic pronunciations in the user's first language for the correct pronunciation of <the word> in the second language, and can use highlighting color or font boldness to show syllable stress (or Mandarin Pinyin tone marks, etc.)

Figure 10:
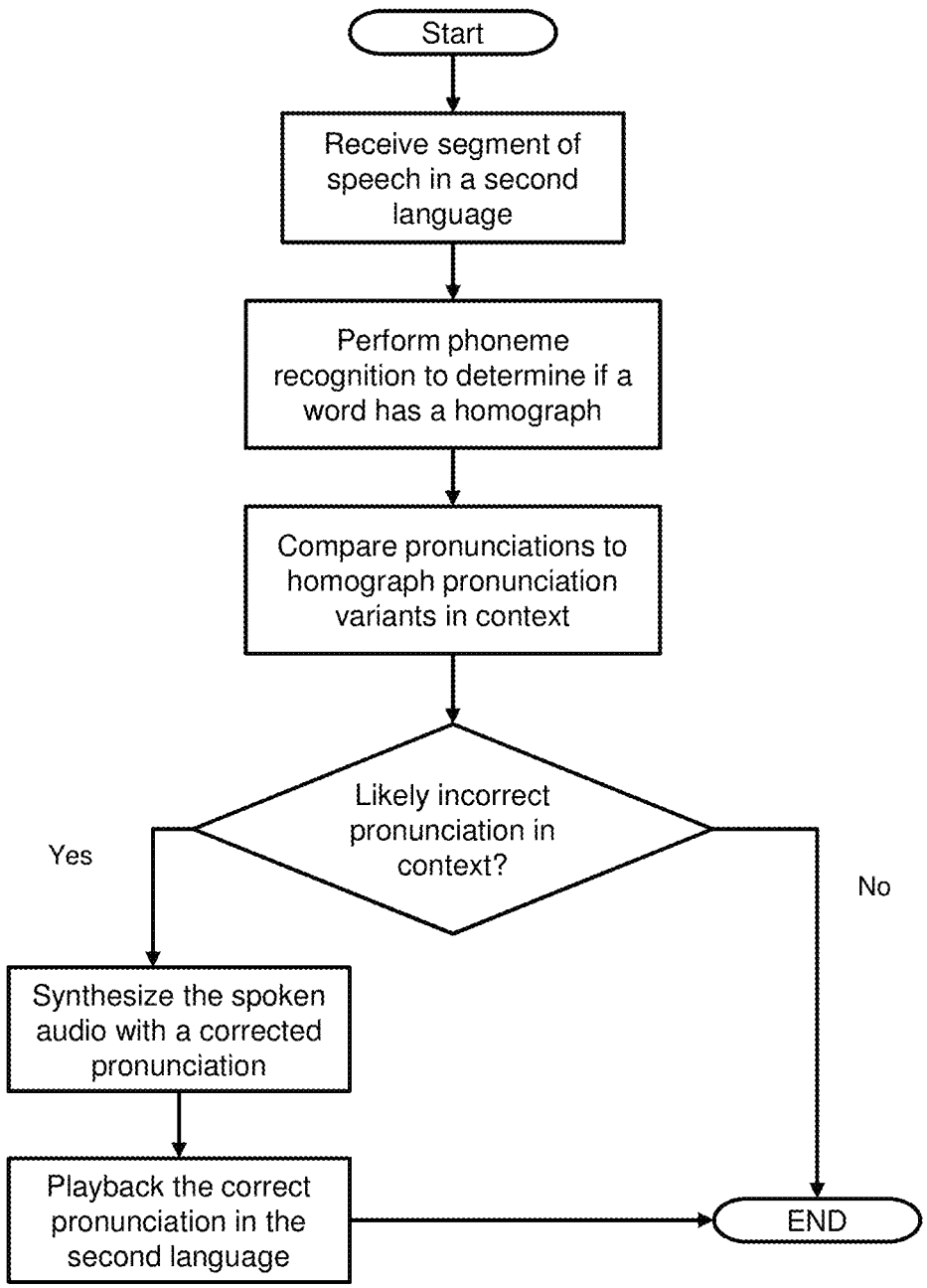
FIG. 10 is a flow chart for correcting pronunciation of a heteronym in a second language in accordance with an embodiment of the invention.

Referring now to FIG. 10, a process is shown wherein, in accordance with an embodiment of the invention, the VA 120 detects and corrects mispronunciations of lexical heteronyms. For example, consider speech audio that includes a pronunciation of a word that would be spelled, in English, WINDY. That lexeme can be pronounced either as "wIndi" or "waIndi" depending on its context. The VA 120 uses a statistical language model, trained on words present near each pronunciation variant of the heteronym, to estimate the more likely correct pronunciation variant. For example, if the speech audio includes any words related to weather then the expected heteronym pronunciation variant is /wIndi/ rather than /waIndi/ and if the speech audio includes any words related to a road, the expected heteronym pronunciation variant is /waIndi/. In some embodiments, the VA 120 estimates the probability of each variant according to the model and only synthesizes spoken audio with a corrected pronunciation if the probability is above a threshold.

Figure 11A:
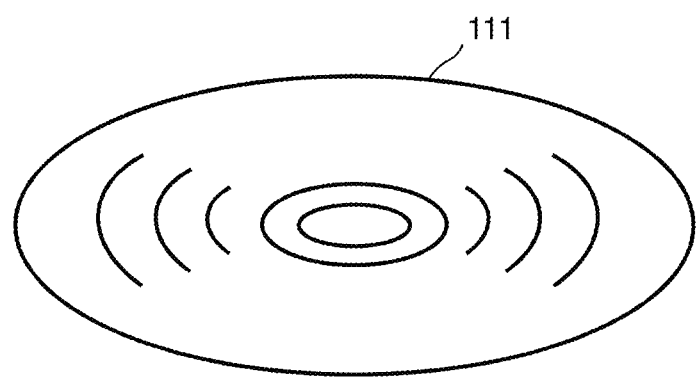
FIG. 11A shows a rotating disk non-transitory computer readable medium according to an embodiment.

FIG. 11A shows an example non-transitory computer readable medium 111 that is a rotating magnetic disk. Data centers commonly use magnetic disks to store code and data for servers. The non-transitory computer readable medium 111 stores code that, if executed by one or more computers, would cause the computer to perform steps of methods described herein. Rotating optical disks and other mechanically moving storage media are possible.

Figure 11B:
FIG. 11B shows Flash RAM chip non-transitory computer readable medium according to an embodiment.

FIG. 11B shows an example non-transitory computer readable medium 112 that is a Flash random access memory (RAM) chip. Data centers commonly use Flash memory to store code and data for servers. Mobile devices commonly use Flash memory to store code and data for system-on-chip devices. The non-transitory computer readable medium 112 stores code that, if executed by one or more computers, would cause the computer to perform steps of methods described herein. Other non-moving storage media packaged with leads or solder balls are possible.

Any type of computer-readable medium is appropriate for storing code according to various embodiments.

Figure 12A:
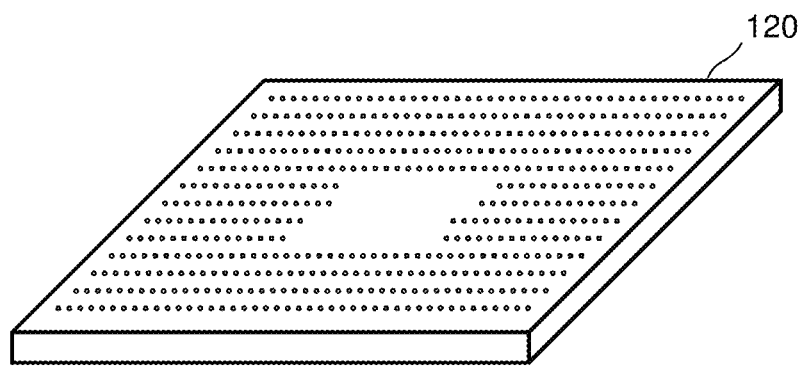
FIG. 12A shows a packaged system-on-chip according to an embodiment.

FIG. 12A shows the bottom side of a packaged system-on-chip (SoC) device 120 with a ball grid array for surface-mount soldering to a printed circuit board. Various package shapes and sizes are possible for various chip implementations. SoC devices control many embedded systems and IoT device embodiments as described herein.

Figure 12B:
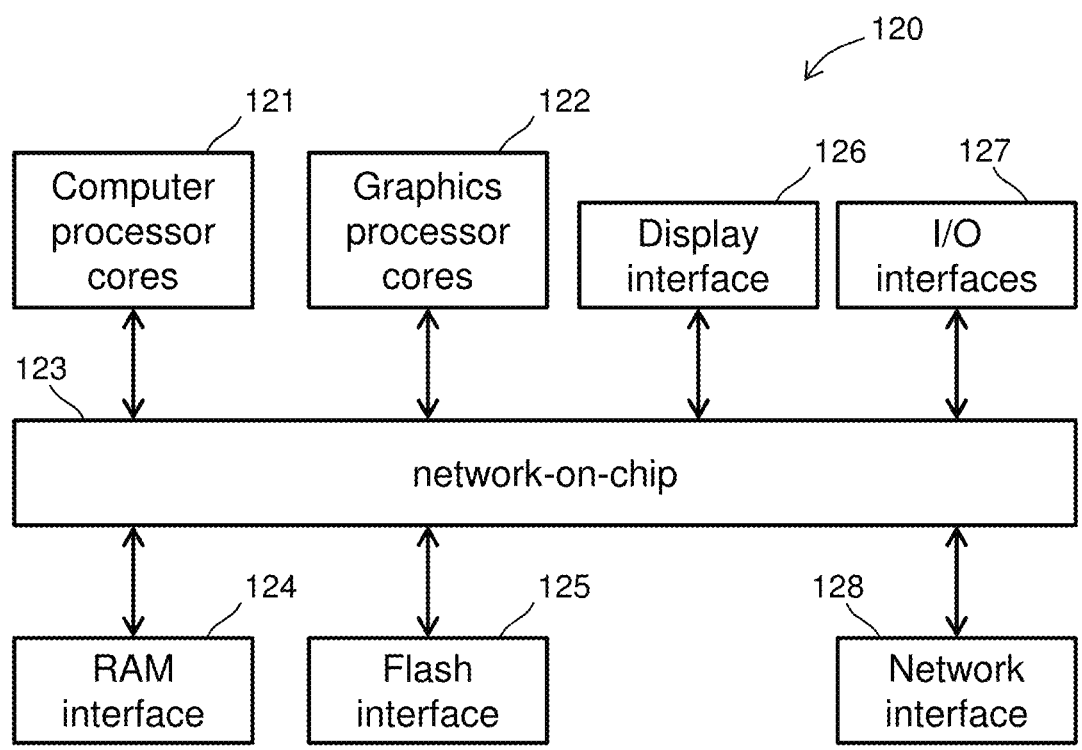
FIG. 12B shows a block diagram of a system-on-chip according to an embodiment.

FIG. 12B shows a block diagram of the system-on-chip 120. The SoC device 120 comprises a multicore cluster of computer processor (CPU) cores 121 and a multicore cluster of graphics processor (GPU) cores 122. The processors 121 and 122 connect through a network-on-chip 123 to an off-chip dynamic random access memory (DRAM) interface 124 for volatile program and data storage and a Flash interface 125 for non-volatile storage of computer program code in a Flash RAM non-transitory computer readable medium. The SoC device 120 also has a display interface 126 for displaying a GUI and an I/O interface module 127 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. The SoC device 120 also comprises a network interface 128 to allow the processors 121 and 122 to access the Internet through wired or wireless connections such as Wi-Fi, 3G, 4G long-term evolution (LTE), 5G, and other wireless interface standard radios as well as ethernet connection hardware. By executing instructions stored in RAM devices through interface 124 or Flash devices through interface 125, the CPUs 121 and GPUs 122 perform steps of methods as described herein.

Figure 13A:
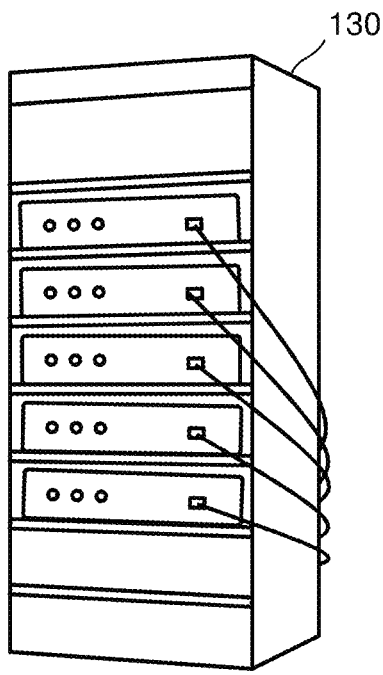
FIG. 13A shows a rack-based server according to an embodiment.

FIG. 13A shows a rack-mounted server blade multiprocessor server system 130 according to some embodiments. It comprises a multiplicity of network-connected computer processors that run software in parallel.

Figure 13B:
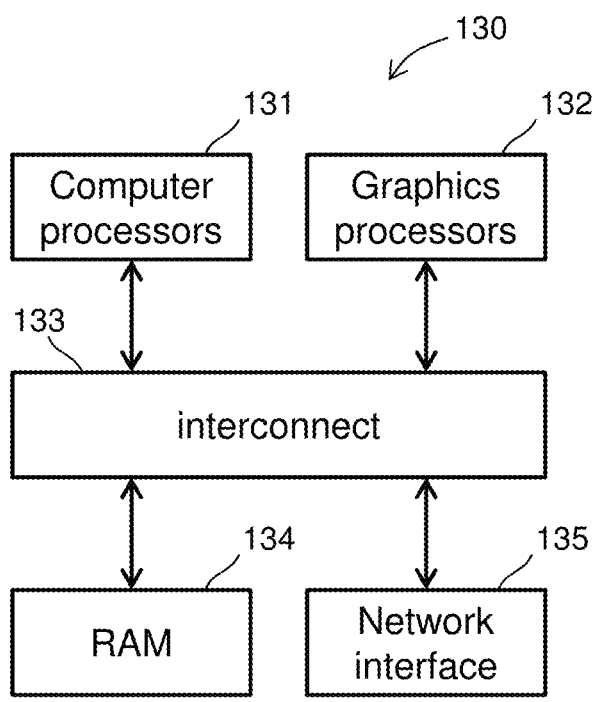
FIG. 13B shows a block diagram of a server according to an embodiment.

FIG. 13B shows a block diagram of the server system 130. The server system 130 comprises a multicore cluster of CPU cores 131 and a multicore cluster of GPU cores 132. The processors connect through a board-level interconnect 133 to random-access memory (RAM) devices 134 for program code and data storage. Server system 130 also comprises a network interface 135 to allow the processors to access the Internet. By executing instructions stored in RAM device 134, the CPUs 131 and GPUs 132 perform steps of methods as described herein.

Various embodiments operate, similarly, for other languages or combinations of languages. Examples shown and described use certain domains of knowledge. Various embodiments operate similarly for other domains or combinations of domains.

Various embodiments are methods that use the behavior of either or a combination of humans and machines. The behavior of either or a combination of humans and machines (instructions that, when executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention. Method embodiments are complete wherever in the world most constituent steps occur. Some embodiments are one or more non-transitory computer readable media arranged to store such instructions for methods described herein. Whatever entity holds non-transitory computer readable media comprising most of the necessary code holds a complete embodiment. Some embodiments are physical devices such as semiconductor chips; hardware description language representations of the logical or functional behavior of such devices; and one or more non-transitory computer readable media arranged to store such hardware description language representations.

Some embodiments are screenless, such as an earpiece, which has no display screen. Some embodiments are stationary, such as a vending machine. Some embodiments are mobile, such as an automobile. Some embodiments are portable, such as a mobile phone. Some embodiments comprise manual interfaces such as keyboard or touch screens. Some embodiments comprise neural interfaces that use human thoughts as a form of natural language expression.

Although the invention has been shown and described with respect to a certain preferred embodiment or embodiments, it is obvious that equivalent alterations and modifications will occur to others skilled in the art upon the reading and understanding of this specification and the drawings. Practitioners skilled in the art will recognize many modifications and variations. The modifications and variations include any relevant combination of the disclosed features. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments. In addition, while a particular feature may have been disclosed with respect to only one of several embodiments, such feature may be combined with one or more other features of the other embodiments as may be desired and advantageous for any given or particular application.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

In accordance with the teachings of the invention, a client device, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

An article of manufacture or system, in accordance with an embodiment of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the exemplary embodiments shown and described herein. Rather, the scope and spirit of the present invention is embodied by the appended claims.

What is claimed is:

1. A method of recognizing incorrect pronunciations of words in speech, the method comprising:
   capturing a segment of speech audio;
   performing phoneme recognition on the segment of speech audio, according to a phonetic model, to produce a digital representation of a phoneme sequence;
   segmenting the digital representation of the phoneme sequence into a word sequence according to a pronunciation dictionary having words pronunciations tagged as incorrect pronunciations;
   producing an output word sequence with a corresponding indication that at least one word in the output word sequence had an incorrect pronunciation in the captured segment of speech audio; and
   updating the pronunciations in the pronunciation dictionary using training data derived from the word sequence with the incorrect pronunciation.

2. The method of claim 1 further comprising storing the incorrect pronunciation of the word in a log of words spoken with incorrect pronunciation.

3. The method of claim 2 further comprising performing a statistical classification on the log, when the log is specific to a speaker, to compute a profile property for the speaker.

4. The method of claim 2, wherein the stored incorrect pronunciation of the word is specific to a speaker.

5. The method of claim 4, wherein the word is represented as characters based on an abugida writing system.

6. The method of claim 4, wherein the word is represented as characters based on a logographic writing system.

7. The method of claim 1 further comprising the steps of:
   correcting the segment of speech audio by replacing the incorrect pronunciation of the word with a correct pronunciation to produce a corrected word sequence; and
   synthesizing, using the corrected word sequence, a synthesized segment of speech audio.

8. A system for training speakers of a second language on correct pronunciations, the system comprising:
   an input device that receives, from a user, a segment of speech audio that includes a plurality of words, at least one word having been spoken with an incorrect pronunciation;
   a phoneme-based automatic speech recognition (ASR) component that performs speech recognition on the segment of speech audio to produce a word sequence and a corresponding indication that a word from the plurality of words is incorrectly pronounced by the user; and
   a speech synthesis component to produce a spoken audio response that includes a correct pronunciation of the incorrectly pronounced word,
   wherein the spoken audio response helps the user learn the pronunciation of the word by repeating the incorrectly pronounced word with a correct pronunciation and the spoken audio response provides a syllable stress that differs from the incorrectly pronounced word having an incorrect syllable stress from a correct pronunciation of the incorrectly pronounced word.

9. The system of claim 8 further comprising a storage component for storing an indication of the incorrectly pronounced word in a log of words spoken with incorrect pronunciations such that pronunciation errors can be analyzed.

10. The system of claim 8 further comprising means to recognize an incorrect pronunciation by detecting incorrect syllable stress of the word.

11. The system of claim 8 further comprising a display component for displaying a transcription of words from the request, wherein the displayed transcription includes the mispronounced word in context with respect to other words with emphasis on the incorrectly pronounced word.

12. The system of claim 8 further comprising a display component for displaying the incorrectly pronounced word with a correct pronunciation for the incorrectly pronounced word shown using written characters from the user's native written language.

13. The system of claim 12, wherein the written characters are part of a logographic writing system.

14. The system of claim 12, wherein the written characters are part of an abjad writing system.

15. The system of claim 12, wherein the written characters are part of an abugida writing system.

\* \* \* \* \*